Figure 1:
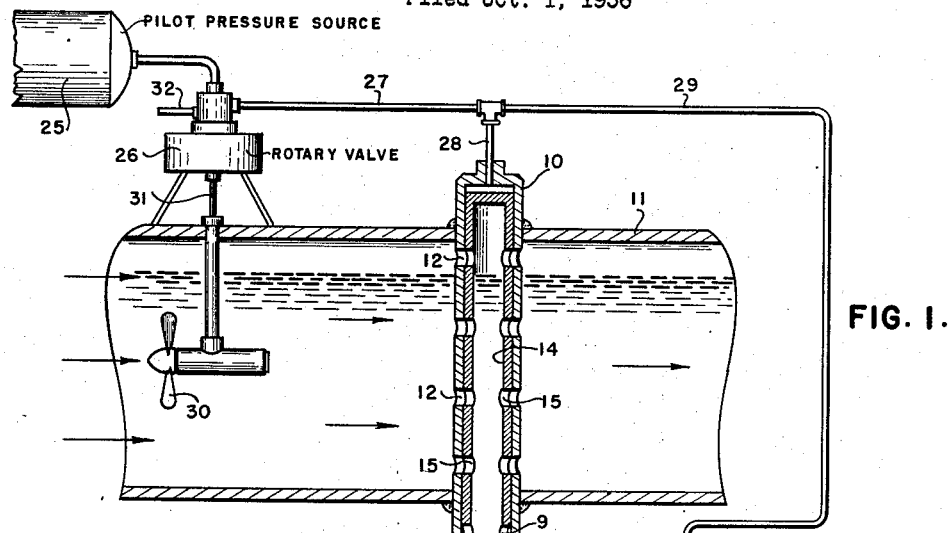

Sept. 29, 1959     S. S. BROWN     2,906,126

FLUID SAMPLER

Filed Oct. 1, 1956

INVENTOR.
STEPHEN S. BROWN,

BY John S. Schneider

ATTORNEY.

2,906,126

FLUID SAMPLER

Stephen S. Brown, La Porte, Tex., assignor, by mesne assignments, to Jersey Production Research Company, Tulsa, Okla., a corporation of Delaware Application October 1, 1956, Serial No. 613,213

1 Claim. (Cl. 73—422)

This invention is directed to a device for taking fluid samples in a receptacle, such as, a pipe or metering tank. More specifically this invention concerns apparatus for sampling fluids contained in a metering tank or flowing in a pipe whereby a sample may be taken in each metering cycle or whereby the rate of sampling is proportional to the rate of fluid flow.

An object of this invention is to provide a device for obtaining an accurate, representative sample of total fluids in a receptacle such as a metering vessel or a pipe.

This invention, briefly, provides an outer hollow member connected to and extending through a receptacle, the hollow member being formed to provide a first plurality of openings. An inner hollow member is sealingly and slidably arranged within the outer hollow member and has a first and a second position. The inner hollow member is formed to provide a second plurality of openings. The first and second openings are aligned when the inner hollow member is in its first position to permit fluid within the receptacle to enter the inner hollow member. The openings are isolated from each other when the inner hollow member is in its second position to prevent fluid in the receptacle from entering the inner hollow member. Fluid discharge means is connected to the outer hollow member and biasing means is positioned in the discharge means to normally urge the inner hollow member to its first position. The inner and outer hollow members cooperate to prevent fluid communication between the inner hollow member and the discharge means when the inner hollow member is in its first position and to fluidly communicate the inner hollow member and the discharge means when the inner hollow member is in its second position and a valve is connected to the discharge means adapted to control the flow of fluid from the discharge means.

Figure 2:
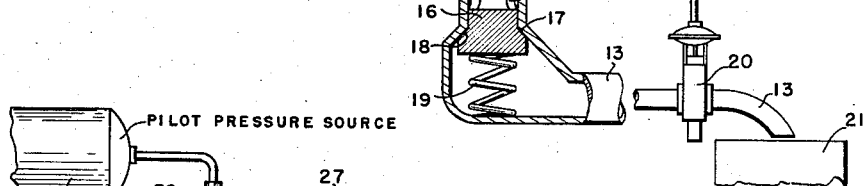
Figure 2:
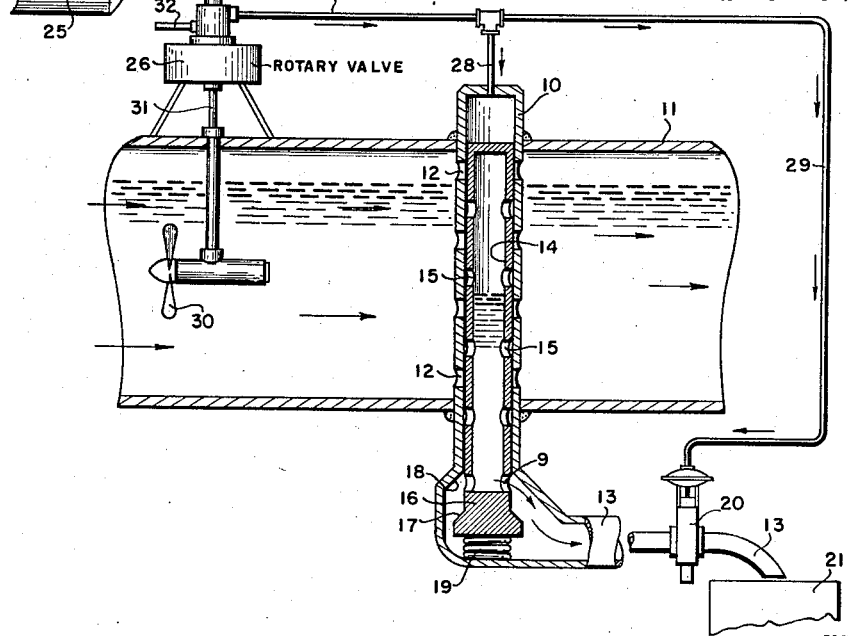

Referring to the drawings:

Fig. 1 is a cross-sectional view of the device positioned in a fluid receptacle, and Fig. 2 is a cross-sectional view similar to Fig. 1, showing the device in sample taking position.

Referring more particularly to the drawings, wherein identical numerals designate identical elements, Figs. 1 and 2 show a tubular member 10 positioned in a receptacle, such as pipe 11, and provided with a plurality of longitudinally spaced openings or perforations 12. The lower end of the tubular member 10 is connected to a discharge conduit 13.

An inner tubular member 14 is slidably arranged within tubular member 10 and is formed to provide a plurality of longitudinally spaced openings 15. The lower end of the inner tubular member 14 is formed to provide a plug 16 having an annular outer sealing surface 17 which is adapted to engage with or seat upon a sealing surface 18 formed on the lower end of outer tubular member 10. The outer and inner tubular members are arranged to provide engaging, sealing, longitudinal surfaces as shown. The inner tubular member 14 has one position wherein the openings 15 are aligned with the openings 12 in outer tubular member 10. In this position the fluid in pipe 11 is permitted to enter the interior of the inner tubular member 14 as seen in Fig. 1.

Inner tubular member 14 is formed to provide an additional opening 9 which is closed off by the lower wall of outer tubular member 10 when openings 12 and 15 are aligned. A spring 19 is positioned in discharge conduit 13 and engages with plug 16 of inner tubular member 14 to normally bias inner tubular member 14 upwardly. A discharge valve 20 is positioned in discharge conduit 13 and is adapted to control the flow of fluid from discharge conduit 13 to a container 21. Valve 20 is a spring biased normally closed diaphragm actuated valve adapted to open in response to a fluid pulse or signal exerted on the diaphragm of the valve; that is, the fluid pulse causes valve 20 to open against the bias of a spring and bleeding of the fluid pulse permits the spring to close the valve.

Any type of system may be employed for actuation of the valve 20 and movement of the inner tubular member 14. As shown, a pilot pressure source designated 25 is connected to a rotary valve means 26. Rotary valve means 26 in one position fluidly communicates with the interior of outer tubular member 10 above inner tubular member 14 by means of conduits 27 and 28 and with the diaphragm of valve 20, by means of conduits 27 and 29. A rotary valve actuating means is shown positioned in pipe 11 and may suitably comprise a propeller 30 adapted to actuate a shaft 31 through suitable gearing (not shown), which in turn mechanically connects with rotary valve 26. The rotary valve is also provided with an exhaust 32, which exhausts or bleeds conduits 27, 28 and 29 when the rotary valve means 26 is in another position.

In the operation:

The flow of fluid designated by the arrowed lines in pipe 11 causes rotation of propeller 30, which in turn rotates shaft 31 to move rotary valve 26 to alternately send a pulse of fluid pressure from pilot source 25 through conduit 27 and to bleed conduit 27 to exhaust 32. The rotary valve 26 operates to selectively transmit a pressure pulse to conduit 27 dependent upon or responsive to the rate of flow in conduit 11. The pulse in conduit 27 passes through conduit 29 to the diaphragm of valve 20 thereby opening this valve. This relieves pressure in conduit 13 from below plug 16. Simultaneously therewith, a pulse of fluid pressure passes through conduit 28 of outer tubular member 10 to the top of inner tubular member 14 thereby forcing inner tubular member 14 downwardly against the bias of spring 19 and fluidly communicates the lowermost opening 9 in inner tubular member 14 with the interior of discharge conduit 13. Thus, a sample of fluid is trapped within inner tubular member 14 when openings 15 and 12 move out of alignment and this trapped sample of fluid is discharged when the lowermost openings 9 fluidly communicate with pipe 13.

Upon further rotation of propellers 30, the rotary valve is positioned to exhaust conduits 27, 28 and 29. This causes valve 20 to close and permits spring or biasing means 19 to move the inner tubular member 14 to its original position whereby the openings 12 and 15 are aligned and the surfaces 17 and 18 on the inner and outer tubular members are engaged thereby preventing fluid communication between the interior of inner tubular member 14 and conduit 13.

Although the pilot pressure system has been described as operating in response to fluid flowing in a pipe, obviously this invention is adaptable for use in a metering tank system whereby the fluid pulse necessary for actuating valve 20 and moving inner tubular member 14 downwardly may be generated by means of a suitable control system employable in such apparatus, as for example, the control system employed in U.S. patent application, Serial No. 588,778, filed June 1, 1956 by Stephen S. Brown, entitled, "Fluid Sampler and Metering Device."

Further, this invention is adaptable for use in a square or rectangular pipe or a vessel provided with a horizontal base and vertical sides whereby the direction of the sample tube is positioned perpendicular to the base. This permits the sampling device to obtain a truly representative sample of the fluid flowing in the pipe or the fluid contained in the metering tank where it is desired to sample a plurality of separable fluids.

Having fully described the objects, elements, and operation of my invention, I claim:

A device for sampling fluids in a receptacle comprising an outer tubular member connected to and extending through said receptacle and provided with a first plurality of openings spaced along substantially the length thereof, an inner tubular member sealingly and slidably arranged within said outer tubular member and having first and second positions, said inner tubular member being provided with a second plurality of openings spaced along substantially the length thereof, said first and second openings being aligned when said inner tubular member is in said first position to permit fluid communication between said inner tubular member and said receptacle and said first and second openings being sealingly isolated from each other when said inner tubular member is in said second position to prevent fluid communication between said inner tubular member and said receptacle, a fluid discharge pipe connected to said outer tubular member, biasing means positioned in said pipe adapted to urge said inner tubular member to said first position, means adapted to prevent fluid communication between said inner tubular member and said pipe when said inner tubular member is in said first position and adapted to permit fluid communication between said inner tubular member and said pipe when said inner tubular member is in said second position, a valve connected in said pipe adapted to control movement of fluids through said pipe, said inner and outer tubular members being provided with closed upper ends which cooperate to form an expansible chamber, and actuating means fluidly communicating with said chamber adapted to move said inner tubular member from said first to said second position in response to movement of fluid through said receptacle and fluidly communicating with said valve adapted to actuate said valve.

References Cited in the file of this patent

UNITED STATES PATENTS

| | | |
|---|---|---|
| 631,549 | Talcott et al. | Aug. 23, 1899 |
| 2,426,369 | Paulsen | Aug. 26, 1947 |
| 2,713,268 | Langsenkamp | July 19, 1955 |
| 2,729,105 | McFarland | Jan. 3, 1956 |
| 2,784,594 | Struck | Mar. 12, 1957 |

FOREIGN PATENTS

| | | |
|---|---|---|
| 481,312 | Canada | Feb. 26, 1952 |
| 702,120 | Great Britain | Jan. 6, 1954 |